(12) United States Patent
Bender (10) Patent No.: US 8,854,299 B2
(45) Date of Patent: Oct. 7, 2014

(54) ORIENTATION BASED APPLICATION LAUNCH SYSTEM

(75) Inventor: Michael John Bender, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 298 days.

(21) Appl. No.: 13/188,639

(22) Filed: Jul. 22, 2011

(65) Prior Publication Data

US 2013/0021236 A1    Jan. 24, 2013

(51) Int. Cl.
| | | |
|---|---|---|
| G09G 5/00 | (2006.01) |
| G06F 3/033 | (2013.01) |
| G06F 3/0346 | (2013.01) |
| H04M 1/725 | (2006.01) |
| G06F 1/16 | (2006.01) |

(52) U.S. Cl.
CPC ............ *G06F 1/1694* (2013.01); *G06F 3/0346* (2013.01); *G06F 2200/1637* (2013.01); *G06F 2200/1614* (2013.01); *H04M 2250/12* (2013.01); *H04M 1/72522* (2013.01)
USPC .......................................... 345/156; 715/863

(58) Field of Classification Search
CPC .......... G06F 1/1694; G06F 2200/1614; G06F 2200/1637; G06F 3/0346
See application file for complete search history.

(56) References Cited

U.S. PATENT DOCUMENTS

| | | | |
|---|---|---|---|
| 7,023,421 B2 | 4/2006 | Wong | |
| 7,065,386 B1 | 6/2006 | Smethers | |
| 7,159,326 B2 | 1/2007 | Linjama | |
| 7,181,251 B2 * | 2/2007 | Stohr et al. .................... 455/566 |
| 7,738,912 B1 | 6/2010 | Hawkins et al. | |
| 7,831,143 B2 | 11/2010 | Okazaki | |
| 2002/0033836 A1 | 3/2002 | Smith | |
| 2005/0104848 A1 * | 5/2005 | Yamaguchi et al. .......... 345/156 |
| 2005/0107121 A1 | 5/2005 | Gamble | |
| 2006/0176278 A1 | 8/2006 | Mathews et al. | |
| 2007/0004451 A1 * | 1/2007 | Anderson .................. 455/556.1 |
| 2007/0093207 A1 | 4/2007 | Kim | |
| 2008/0194203 A1 | 8/2008 | Hong | |
| 2009/0025089 A1 | 1/2009 | Martin et al. | |

(Continued)

FOREIGN PATENT DOCUMENTS

| | | | | |
|---|---|---|---|---|
| EP | 2 224 312 A1 | 4/2006 | | |
| EP | 1 804 472 A1 | 4/2007 | | |
| WO | WO 2005/041546 A2 | 5/2005 | | |
| WO | WO2012123788 | * | 9/2012 | ................ G06F 1/16 |

OTHER PUBLICATIONS

"Sony Ericsson K750i user guide"; Internet citation; Feb. 1, 2005; pp. 1-46; XP002520081; Retrieved from the Internet: URL:http://www.sonyericsson.com/cws/download/1/167/202/1192990327/K750i_UG_R2b_EN.pdf.

(Continued)

*Primary Examiner* — Dwayne Bost
*Assistant Examiner* — Christopher Kohlman
(74) *Attorney, Agent, or Firm* — Finnegan, Henderson, Farabow, Garrett & Dunner LLP (57) ABSTRACT

An electronic device may include multiple faces, an application launch input element, a memory that stores multiple applications, and a processor that accesses the memory. In response to a detected trigger of the application launch input element, the processor determines the orientation of the device. For example, the processor may determine which face of the electronic device is pointed in a predetermined direction. Based on the determined orientation of the device, the processor selects and activates a specific application from the multiple available applications.

17 Claims, 5 Drawing Sheets

(56) References Cited

U.S. PATENT DOCUMENTS

| | | | |
|---|---|---|---|
| 2009/0225026 A1* | 9/2009 | Sheba | 345/156 |
| 2009/0303177 A1* | 12/2009 | Chou et al. | 345/156 |
| 2010/0056052 A1 | 3/2010 | Tsai | |
| 2010/0069115 A1 | 3/2010 | Liu | |
| 2010/0328201 A1 | 12/2010 | Marvit | |

OTHER PUBLICATIONS

The Bar of Soap V.1 User Study; accessed online at http://web.media.mit.edu/~bttaylor/BoSweb/v1_study.html on Jul. 15, 2011; 4 pages.

Bar of Soap; accessed online at http://web.media.mit.edu/~bttaylor/BoSweb/BoS_index.html on Jul. 15, 2011; 1 page.

Taylor, Brandon Thomas; "Graspables: Grasp Recognition as a User Interface"; Thesis paper submitted to the Program in Media Arts and Sciences, School of Architecture and Planning at the Massachusetts Institute of Technology; Sep. 2008; 87 pages.

Wang, Alf Inge et al.; "CAMF—Context-Aware Machine Learning Framework for Android"; lasted International Conference on Software Engineering and Applications (SEA 2010); Nov. 8-10; Marina Del Rey, California; 2010.

Canadian Office Action dated Jul. 30, 2014, issued in Canadian Application No. 2,783,263, (3 pages).

* cited by examiner

ORIENTATION BASED APPLICATION LAUNCH SYSTEM

BACKGROUND

1. Technical Field

This application relates to electronic devices and, more particularly, to an orientation based application launch system for an electronic device.

2. Related Art

Electronic devices may include an input element that allows a user to selectively launch software applications. As one example, a mobile phone may include a quick launch button or convenience key that is associated with an application chosen by the user. By allowing the user to choose the application that is associated with the quick launch button, the device provides quick and convenient access to the user's chosen application. For example, the user may access the chosen application with a single button press without needing to traverse through a series of menus displayed on the device to find the application.

Although quick launch buttons are convenient for the user, the number of quick launch buttons included on a device is limited. Some devices may only include one quick launch button. In an implementation with only one quick launch button, the user may be forced to select only one application that can be launched quickly. This can be problematic when the user desires quick access to different applications in different situations yet only has a limited number of quick launch buttons.

BRIEF DESCRIPTION OF THE DRAWINGS

The system may be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

An electronic device is often loaded with several different software applications. The electronic device may also have an application launch input element, such as a quick launch button, that a user may customize to be associated with a specific application. When the user triggers the input element (e.g., presses the quick launch button), the electronic device activates the application that is associated with the input element. Some users desire quick access to a greater number of applications than allowed by the number of available application launch input elements on the device. Additionally, some applications require a fast activation in order to be useful. For example, some photography opportunities pass before the user can activate the camera application, especially if the camera application is not quickly accessible via a quick launch button. However, when a device has only one quick launch button (or a limited number of quick launch buttons), some users may prefer to have the quick launch button associated with an application that is used more often than the camera application, such as a messaging application or an Internet browser application.

To address these issues, more than one application may be associated with an application launch input element by distinguishing between different orientations of the device. In one implementation, up to six applications may be associated with a single application launch input element by associating a first application with a "top up" orientation of the device, a second application with a "bottom up" orientation of the device, a third application with a "front up" orientation of the device, a fourth application with a "back up" orientation of the device, a fifth application with a "right side up" orientation of the device, and a sixth application with a "left side up" orientation of the device. When the user triggers the input element (e.g., presses or actuates the quick launch button), the electronic device identifies the current device orientation and launches the application associated with that orientation.

Figure 1:
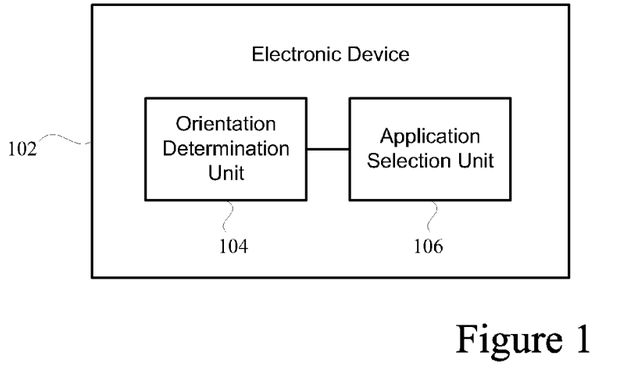
FIG. 1 illustrates an electronic device with an orientation based application launch system.

FIG. 1 illustrates an electronic device 102 with an orientation based application launch system. The orientation based application launch system includes an orientation determination unit 104 in communication with an application selection unit 106. The orientation determination unit 104 may include a computer or signal processor that executes computer-readable instructions retained in a local or distributed memory to identify the current orientation of the electronic device 102. For example, the orientation determination unit 104 may determine, in response to a trigger of an application launch input element of the electronic device 102, whether a first face, a second face, or another face of the electronic device 102 is pointed in a predetermined direction.

The application selection unit 106 may include a computer or signal processor that executes computer-readable instructions retained in a local or distributed memory to identify which available application should be launched in response to the user triggering the application launch input element. For example, the application selection unit 106 may activate a different application when the first face is pointed in the predetermined direction when the application launch input element is triggered than when the second face is pointed in the predetermined direction when the application launch input element is triggered. In one implementation, the processor of the orientation determination unit 104 may be the same processor that is used in the application selection unit 106. In another implementation, the processor of the orientation determination unit 104 may be different than the processor used in the application selection unit 106.

FIGS. 2-7 illustrate the electronic device 102 in a plurality of different orientations. In one implementation, the different orientations of the electronic device 102 are differentiated based on which face of the electronic device 102 is pointed in a predetermined direction. The electronic device 102 includes a plurality of faces. In the implementation of FIGS. 2-7, the electronic device 102 may include a top face 202, a bottom face 204, a left side face 206, a right side face 208, a front face 210, and a back face 402. The faces may be flat or include one or more curved portions. For example, if the electronic device 102 is modeled as a rectangular prism, then each of the faces may each be substantially flat and form 90 (or about 90) degree angles at the junctions between faces. However, in reality, the faces may have various curved portions and/or may form smooth continuous transitions between faces. A smooth continuous transition may blur the line between two adjoining faces. For example, a surface of the top face 202 may make a smooth curved transition to a surface of the front face 210. Even where the electronic device 102 uses curved surfaces and smooth curved transitions between faces, the orientation determination unit of the electronic device may still determine which face of the multiple faces is generally pointed in the predetermined direction (e.g., "up" relative to a surface of the Earth). Where none of the faces are pointing directly in the predetermined direction, the orientation determination unit of the electronic device may select one face that is most closely pointed in the predetermined direction. The system may treat this selected face as the face that is pointed in the predetermined direction for purposes of orientation based application selection.

Figure 2:
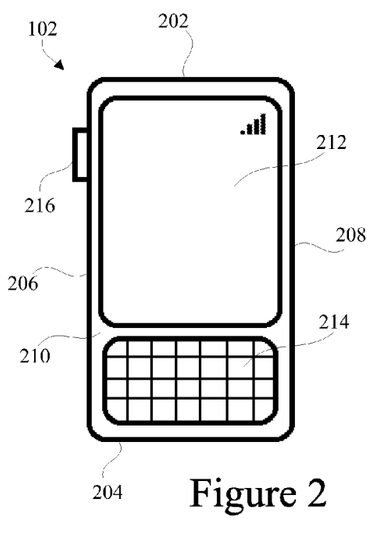
FIG. 2 illustrates an electronic device in a "top up" orientation.
Figure 3:
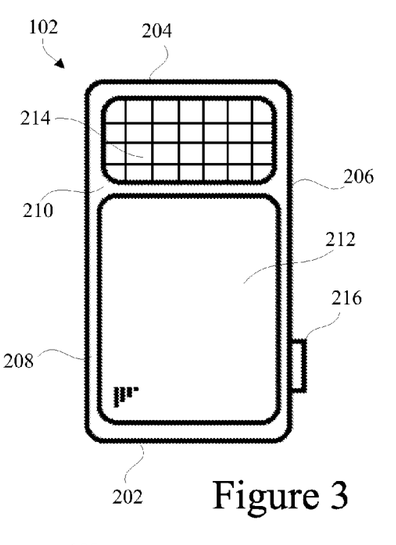
FIG. 3 illustrates an electronic device in a "bottom up" orientation.
Figure 4:
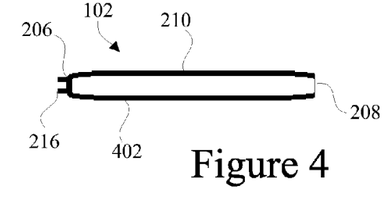
FIG. 4 illustrates an electronic device in a "front up" orientation.
Figure 5:
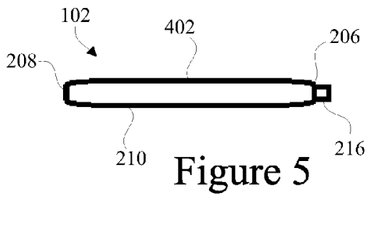
FIG. 5 illustrates an electronic device in a "back up" orientation.
Figure 6:
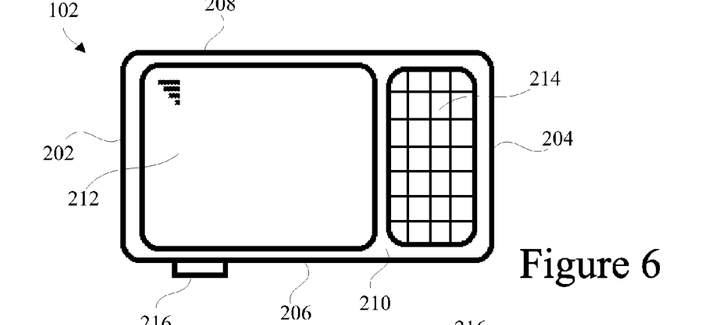
FIG. 6 illustrates an electronic device in a "right side up" orientation.
Figure 7:
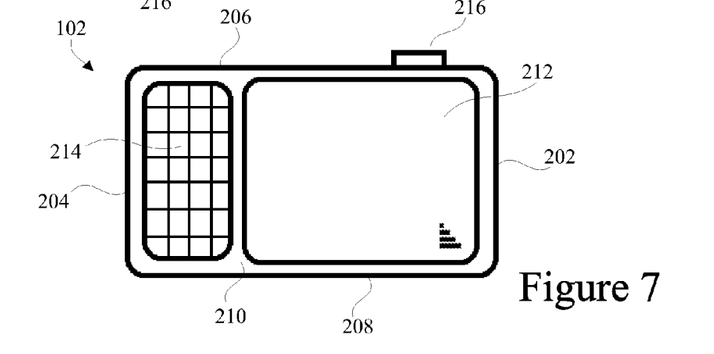
FIG. 7 illustrates an electronic device in a "left side up" orientation.

FIG. 2 illustrates the electronic device 102 in a "top up" orientation. A "top up" orientation would result, for example, when a user is holding the electronic device 102 in a position where the top face 202 is pointed towards the sky (e.g., when the top face 202 faces up) and the bottom face 204 is pointed towards the surface of the Earth (e.g., when the bottom face 204 faces down). FIG. 3 illustrates the electronic device 102 in a "bottom up" orientation. A "bottom up" orientation would result, for example, when a user is holding the electronic device 102 in a position where the bottom face 204 is pointed towards the sky and the top face 202 is pointed towards the surface of the Earth. FIG. 4 illustrates the electronic device 102 in a "front up" orientation. A "front up" orientation would result, for example, when a user is holding the electronic device 102 in a position where the front face 210 is pointed towards the sky and the back face 402 is pointed towards the surface of the Earth. FIG. 5 illustrates the electronic device 102 in a "back up" orientation. A "back up" orientation would result, for example, when a user is holding the electronic device 102 in a position where the back face 402 is pointed towards the sky and the front face 210 is pointed towards the surface of the Earth. FIG. 6 illustrates the electronic device 102 in a "right side up" orientation. A "right side up" orientation would result, for example, when a user is holding the electronic device 102 in a position where the right side face 208 is pointed towards the sky and the left side face 206 is pointed towards the surface of the Earth. FIG. 7 illustrates the electronic device 102 in a "left side up" orientation. A "left side up" orientation would result, for example, when a user is holding the electronic device 102 in a position where the left side face 206 is pointed towards the sky and the right side face 208 is pointed towards the surface of the Earth.

A face of the electronic device 102 may be considered to be in the "up" position when it is pointed away from a plane that approximates the local surface of the Earth. As one example, when the front face 210 is pointed up towards the sky (or ceiling when in a building) relative to the surface of the Earth (or floor when in a building), the electronic device 102 is likely in the "face up" orientation. This orientation may occur when the back face 402 of the electronic device 102 is laid flat against the surface of a table. Although the described examples select which face of the electronic device 102 is most pointed in the "up" direction, other orientation determinations may be made instead or additionally. For example, the system may alternatively determine which face of the electronic device 102 is most pointed downward, forward, or any other direction.

As shown in FIGS. 2-7, the electronic device 102 may also include a display device 212, a user input device 214 (e.g., keypad or touch screen), and an application launch input element 216. In the implementation of FIGS. 2-7, the display device 212 and the user input device 214 are part of the front face 210 of the electrical device. The application launch input element 216 may be a "quick launch" button that a user may customize to be associated with one or more available applications. In one implementation, the application launch input element 216 is a physical button or key extending out from a housing of the electronic device 102. In another implementation, the application launch input element 216 is a virtual button visually depicted on the display device 212.

Figure 8:
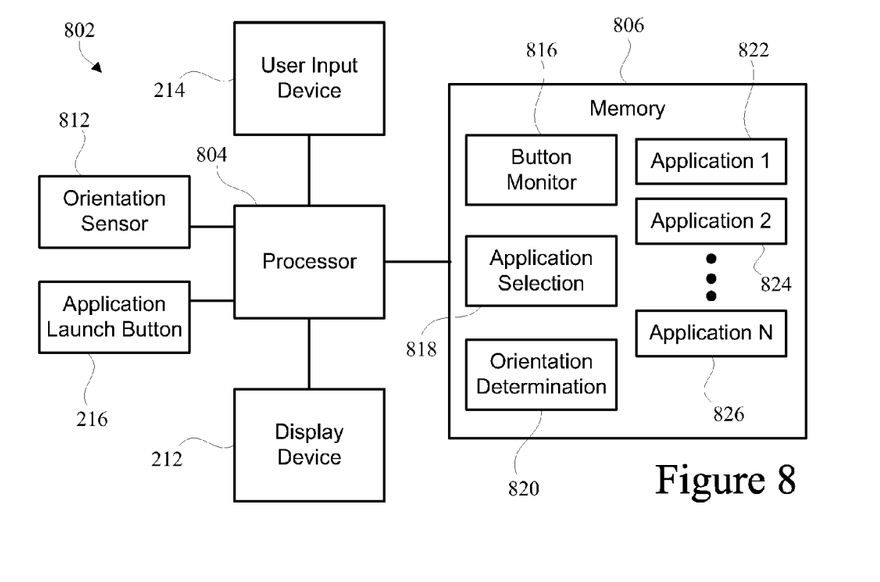
FIG. 8 illustrates an orientation based application launch system.

FIG. 8 illustrates an orientation based application launch system 802. The system 802 includes a processor 804, a memory 806, a display device 212, a user input device 214, an application launch button 216, and an orientation sensor 812. The memory 806 may store a button monitor program 816, an application selection program 818, an orientation determination program 820, and a plurality of applications 822, 824, and 826.

The display device 212 may render a graphical user interface that displays content to the user. For example, one or more of the applications 822, 824, and 826, when activated, may produce visual content that is displayed to the user on the display device 212. The user input device 214 (e.g., keypad, touch screen, etc.) allows the user to input requests or other information to the electronic device. The orientation sensor 812 may comprise or include an accelerometer, inertial sensor, or another type of orientation determination device. The application launch button 216 may be a standalone physical button or key (e.g., a convenience key) extending out from a housing of the electronic device. Alternatively, the application launch button 216 may be part of the user input device 214 that includes other input elements. In another implementation, the application launch button 216 is a virtual button visually depicted on the display device 212.

In response to a trigger of the application launch button 216 (e.g., a when a user presses the application launch button), the processor 804 identifies the orientation of the electronic device 102. For example, the processor 804 may determine which face of the electronic device 102 is most pointed in a predetermined direction. The processor 804 may select one of the available applications 822, 824, and 826 for activation in response to the trigger of the application launch button 216. The processor 804 may activate different applications in different orientations. For example, the processor 804 may select and activate the application 822 when a first face of the electronic device is pointed in the predetermined direction when the application launch button 216 is triggered. When a second face of the electronic device is pointed in the predetermined direction when the application launch button 216 is triggered, the processor 804 may select and activate a different application, such as the application 824.

The orientation based application launch system of FIG. 8 illustrates more detail of the orientation based application launch system of FIG. 1. For example, the components shown in FIG. 8 may perform the functions of the orientation determination unit 104 and the application selection unit 106 of FIG. 1. Specifically, the processor 804, the orientation sensor 812, and the orientation determination program 820 of FIG. 8 may collectively serve as the orientation determination unit 104 of FIG. 1, while the processor 804 and the application selection program 818 of FIG. 8 may collectively serve as the application selection unit 106 of FIG. 1.

The processor 804 may execute a number of different programs or applications during the orientation based application selection process. In one implementation, the processor 804 executes the button monitor program 816 to detect when the application launch button 216 is triggered. In response to a detected trigger of the application launch button 216, the processor 804 may activate (e.g., launch) the application selection program 818 before launching the user's desired application. In this manner, the application selection program 818 may serve as an intermediary between the button press and the user's desired application.

After the application selection program 818 is activated, the system determines the orientation of the electronic device when the application launch button 216 was triggered. In one implementation, the orientation determination program 820 and the orientation sensor 812 together determine the orientation of the device. For example, the orientation determination program 820 may receive raw orientation data originating from the orientation sensor 812.

The orientation determination program 820 may interpret the orientation data received from the orientation sensor 812 to identify which face of the electronic device is pointed in a predetermined direction. The orientation determination program 820 may output an indication of the device orientation to the application selection program 818. In one implementation, the orientation determination program 820 outputs a binary representation of the number 1, the number 2, the number 3, the number 4, the number 5, or the number 6 to indicate which of the six possible device faces is pointed in the predetermined direction. In other implementations, the system may utilize more or less than six possible orientations and the output of the orientation determination program 820 would reflect the appropriate number of possible orientations. The application selection program 818 uses the received orientation information to cause the processor 804 to activate a predetermined application of the plurality of applications 822, 824, and 826. For example, if the output from the orientation determination program 820 indicates that the device is in the "face up" orientation, then the application selection program 818 accesses a collection of predetermined links between orientations and applications, and causes the processor 804 to activate the application linked with the "face up" orientation.

The collection of predetermined links accessible by the application selection program 818 may include a first predetermined link between the first face and a first application 822 and a second predetermined link between the second face and a second application 824. The links may be default system links or may be established by the user. The application selection program 818 may cause the processor 804 to activate the first application 822 based on the first predetermined link when the first face is pointed in the predetermined direction when the application launch button 216 is triggered. Similarly, the application selection program 818 may cause the processor 804 to activate the second application 824 based on the second predetermined link when the second face is pointed in the predetermined direction when the application launch button 216 is triggered.

Figure 9:
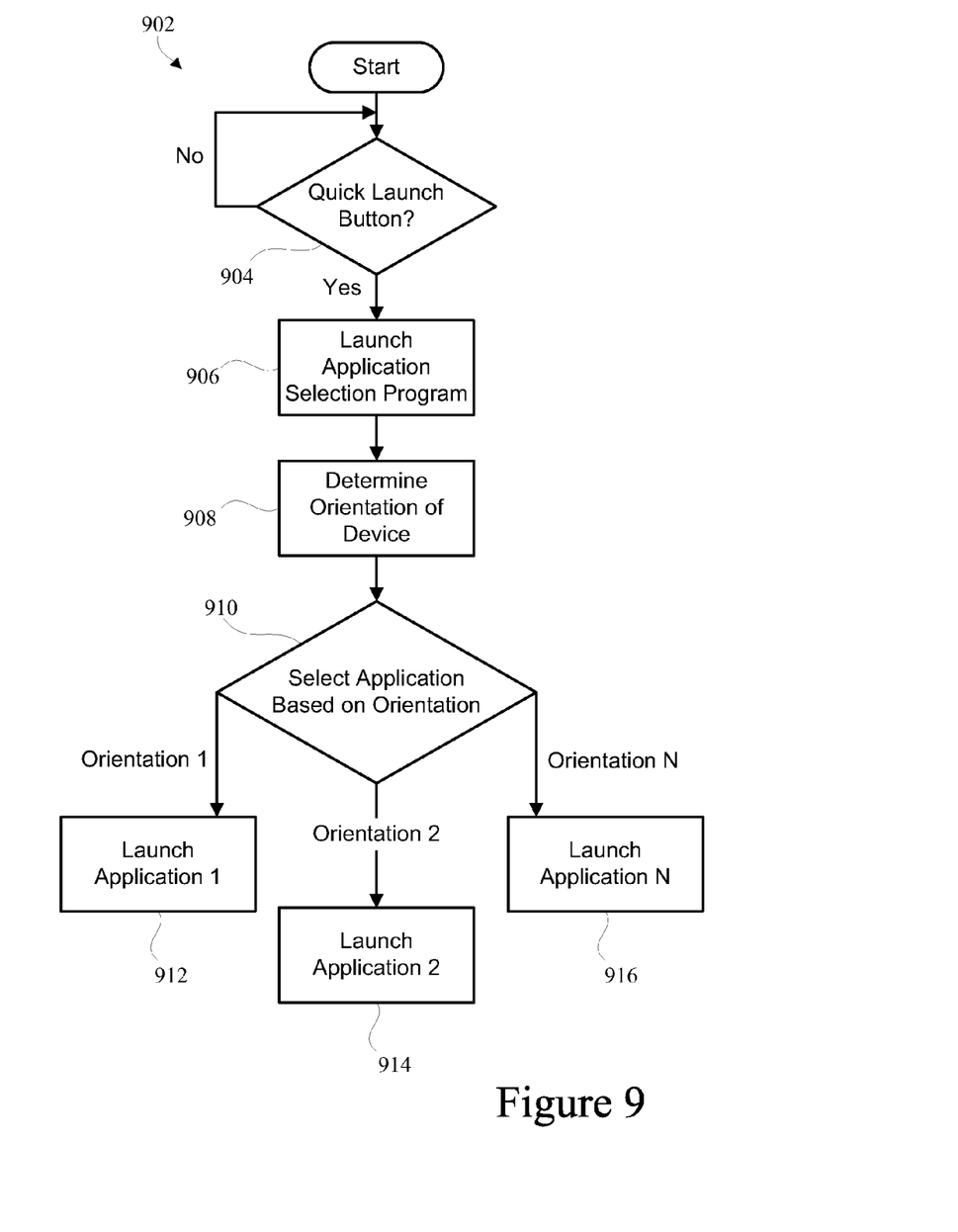
FIG. 9 illustrates an orientation based application launch method.

FIG. 9 illustrates an orientation based application launch method 902. The method 902 may start by monitoring user input signals at act 904 to determine whether the user triggered the application launch input element of the electronic device. If the user has not triggered the application launch input element, then the method 902 may wait for the application launch input element to be triggered. Once the user triggers the application launch input element, such as by pressing the quick launch button of the electronic device or the occurrence of an event, the method proceeds to act 906. At act 906, the application selection program is launched.

At act 908, the application selection program determines the orientation of the electronic device. For example, the application selection program may obtain data from one or more orientation circuits or programs to determine which face of the electronic device is pointed in a predetermined direction. At act 910, an application is selected from the multiple available applications based on the determined orientation of the electronic device. To select the appropriate application based on the device orientation, the application selection program may access a collection of one or more default or user-defined links between specific applications and corresponding orientations.

If the application selection program determines that the electronic device is in a first orientation (e.g., that a first face of the electronic device is pointed in the predetermined direction), then the first application that is linked with the first orientation is launched at act 912. If the application selection program determines that the electronic device is in a second orientation (e.g., that a second face of the electronic device is pointed in the predetermined direction), then the second application that is linked with the second orientation is launched at act 914. If the application selection program determines that the electronic device is in an Nth (e.g., third, fourth, fifth, sixth, etc.) orientation, then the Nth application that is linked with the Nth orientation is launched at act 916.

Figure 10:
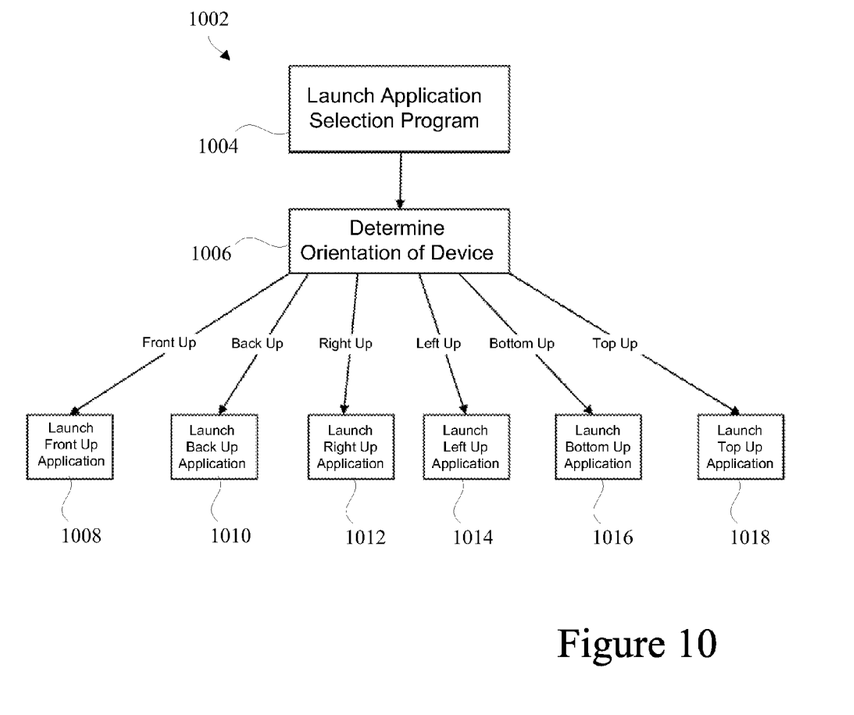
FIG. 10 illustrates another orientation based application launch method.

FIG. 10 illustrates an orientation based application launch method 1002 based on which face of the electronic device is pointed in a predetermined direction. The method 1002 of FIG. 10 illustrates a more detailed implementation of the general method 902 of FIG. 9. The method 1002 begins after a user has triggered the application launch input element. Once the user triggers the application launch input element, such as by pressing the quick launch button of the electronic device, the method begins at act 1004 where the application selection program is launched. At act 1006, the application selection program determines the orientation of the electronic device. For example, the application selection program may obtain data from one or more local or remote orientation circuits, programs, or signals to determine which face of the electronic device is pointed in a predetermined direction (e.g., "up" relative to a surface of the Earth).

When the application selection program determines that the electronic device is in a predetermined orientation, such as a "front up" orientation, the "front up" application that is linked with the "front up" orientation is launched at act 1008. When the application selection program determines that the electronic device is in a different predetermined orientation, such as when the device is in a "back up" orientation, the "back up" application that is linked with the "back up" orientation is launched at act 1010. When the application selection program determines that the electronic device is in a "right side up" orientation, the "right side up" application that is linked with the "right side up" orientation is launched at act 1012. When the application selection program determines that the electronic device is in a "left side up" orientation, the "left side up" application that is linked with the "left side up" orientation is launched at act 1014. When the application selection program determines that the electronic device is in a "bottom up" orientation, the "bottom up" application that is linked with the "bottom up" orientation is launched at act 1016. When the application selection program determines that the electronic device is in a "top up" orientation, the "top up" application that is linked with the "top up" orientation is launched at act 1018. Other orientations of the electronic device may be predetermined or dynamically determined to allow for additional applications to be launched in response to a trigger of the application launch input element.

Figure 11:
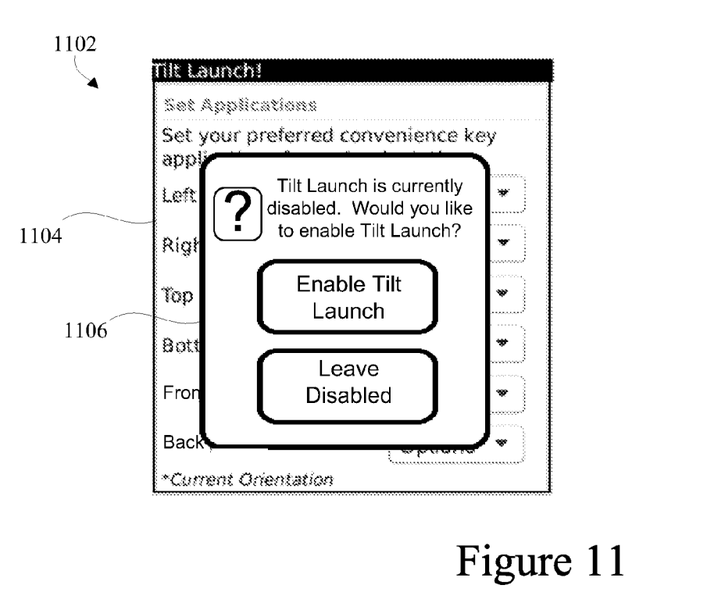
FIG. 11 is a first view of a user interface for an orientation based application launch system.

FIG. 11 illustrates a user interface 1102 for an orientation based application launch system. The user interface 1102 may be displayed on a display area of the electronic device in response to the user requesting access to the system settings. The user interface 1102 includes an application launch settings input element 1104 and an enablement element 1106. The application launch settings input element 1104 is shown in the background behind the enablement element 1106 in the view of FIG. 11. For example, the enablement element 1106 may be a pop-up window displayed on top of the application launch settings input element 1104. The application launch settings input element 1104 will be described below in more detail below in connection with FIG. 12. In one implementation, the enablement element 1106 is displayed with the content shown in FIG. 11 when the system settings data is requested by the user and the system is currently disabled. In this mode, the enablement element 1106 provides the user with the ability to enable the orientation based application launch system or leave the system disabled. In another implementation, the enablement element 1106 is displayed with different content when the system settings data is requested by the user and the orientation based application launch system is already enabled. In this mode, the enablement element 1106 provides the user with the ability to disable the orientation based application launch system or leave the system enabled.

The enablement element 1106 allows the user to switch between an active state and a non-active state. The system enables device face direction orientation based application activation while the enablement element 1106 is in the active state. The system also disables device face direction orientation based application activation while the enablement element 1106 is in the non-active state. Because the user may switch between states (e.g., an active state and a non-active state, for example), the user can control when the system considers orientation before launching an application in response to a trigger of the application selection input element. If the user switches the system into the non-active state, then the system may launch an associated application without considering the orientation of the device.

Figure 12:
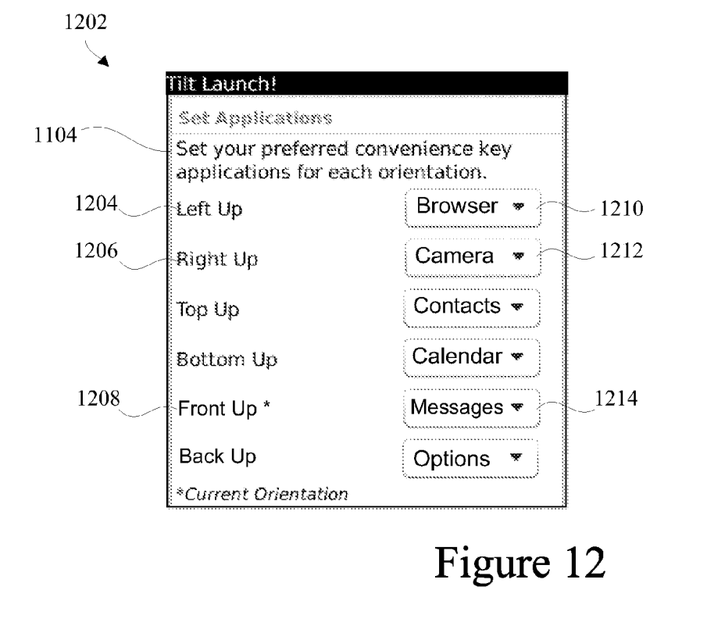
FIG. 12 is a second view of a user interface for an orientation based application launch system.

FIG. 12 illustrates a user interface 1202 for an orientation based application launch system. The user interface 1202 may be rendered by a processor on a display area of the electronic device in response to the user requesting access to the system settings. The user interface 1202 may include an application launch settings input element 1104. In one implementation, the application launch settings input element 1104 is fully visible to the user in the user interface 1202 after the user selects the active or non-active status on the enablement element 1106 shown in front of the application launch settings input element 1104 in FIG. 11.

The application launch settings input element 1104 includes one or more listed face direction orientations 1204, 1206, and 1208, and one or more user input fields 1210, 1212, and 1214. The user input fields allow a user to choose specific applications to be associated with specific face direction orientations. The user input fields 1210, 1212, and 1214 are shown as drop down menus in the implementation of FIG. 12, although other input elements may be used, such as text entry boxes or file selection "browse" buttons. The drop down menus may provide a list of all applications available to be linked with a listed face direction orientation. In one implementation, the number of face direction orientations displayed in the application launch settings input element 1104 is equal to the number of user input fields. For example, for each of the face direction orientations, such as the face direction orientations 1204, 1206, and 1208, there is a corresponding input field, such as the input fields 1210, 1212, and 1214.

The application launch settings input element 1104 of the user interface 1202 allows creation of links between face direction orientations and applications. As one example, the user may select an Internet browser application to be associated with the "left up" orientation 1204 by selecting the browser application from the input field 1210. This association creates a link stored in computer memory between the "left up" orientation and the browser application. The system may later access this link to know to launch the browser application when the quick launch button is pressed while the device is in the "left up" orientation. As another example, the user may select a camera application to be associated with the "right up" orientation by selecting the camera application from the pull down menu 1212. This association creates a link stored in computer memory between the "right up" orientation and the camera application. The system may later access this link to know to launch the camera application when the quick launch button is pressed while the device is in the "right up" orientation. As yet another example, the user may select a messaging application to be associated with the "front up" orientation by selecting the messaging application from the pull down menu 1214. This association creates a link stored in computer memory between the "front up" orientation and the messaging application. The system may later access this link to know to launch the messaging application when the quick launch button is pressed while the device is in the "front up" orientation.

The implementation of the user interface 1202 in FIG. 12 shows a different application associated with each of the possible device orientations. In other implementations, the same application may be associated with multiple device orientations. For example, the user may select to pair the camera application with one device orientation while pairing the messaging application with the remainder of the possible device orientations.

The application launch settings input element 1104 of the user interface 1202 may also include an indication of a current face direction orientation of the electronic device while the user interface 1202 is displayed in the display area of the electronic device. In the implementation of FIG. 12, the user interface 1202 displays a star (*) next to the orientation name that is identified as the current orientation of the electronic device. For example, the star is next to the "front up" orientation name, which indicates that the device is currently in the "front up" position, such as when the device is laying flat on a table. If the user moved the device so that the it was in the "top up" implementation, then the user interface 1202 would move the star to be located next to the "top up" implementation name. The current face direction orientation indicator helps the user know which orientation name corresponds to how the device is being held while the user is selecting which application to pair with which orientation.

Each of the processes described herein may be encoded in a computer-readable storage medium (e.g., a computer memory), programmed within a device (e.g., one or more circuits or processors), or may be processed by a controller or a computer. If the processes are performed by software, the software may reside in a local or distributed memory resident to or interfaced to a storage device, a communication interface, or non-volatile or volatile memory in communication with a transmitter. The memory may include an ordered listing of executable instructions for implementing logic. Logic or any system element described may be implemented through optic circuitry, digital circuitry, through source code, through analog circuitry, or through an analog source, such as through an electrical, audio, or video signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable storage medium," "machine-readable medium," "propagated-signal" medium, and/or "signal-bearing medium" may comprise a medium (e.g., a non-transitory medium) that stores, communicates, propagates, or transports software or data for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include:

an electrical connection having one or more wires, a portable magnetic or optical disk, a volatile memory, such as a Random Access Memory (RAM), a Read-Only Memory (ROM), an Erasable Programmable Read-Only Memory (EPROM or Flash memory), or an optical fiber. A machine-readable medium may also include a tangible medium, as the software may be electronically stored as an image or in another format (e.g., through an optical scan), then compiled, and/or interpreted or otherwise processed. The processed medium may then be stored in a computer and/or machine memory.

While various embodiments of the present system have been described, it will be apparent to those of ordinary skill in the art that many more embodiments and implementations are possible within the scope of the disclosure. Accordingly, the disclosure is not to be restricted except in light of the attached claims and their equivalents.

What is claimed is:

1. An electronic device, comprising:
a first face;
a second face;
an application launch input element;
a memory configured to store a plurality of applications; and
a processor coupled with the memory and configured to identify, in response to a trigger of the application launch input element, whether the first face, the second face, or another face of the electronic device is pointed in a predetermined direction;
wherein the processor is configured to activate a different application of the plurality of applications when the first face is pointed in the predetermined direction when the application launch input element is triggered than when the second face is pointed in the predetermined direction when the application launch input element is triggered, and
wherein the processor is configured to:
display, on a display device of the electronic device, a user interface displaying a list including names of a first face direction orientation corresponding to the first face, a first application of the plurality of applications linked to the first face direction orientation, a second face direction orientation corresponding to the second face, and a second application of the plurality of applications linked to the second face orientation;
display, in the user interface, an indication of a current face direction orientation of the electronic device adjacent a name of the first face direction orientation that is the current face direction orientations;
detect a change of the current face direction orientation from the first face direction orientation to the second face direction orientation; and
cause the indication to move, in the displayed list, from adjacent the name of the first face direction orientation to adjacent a name of the second face direction orientation after detecting the change of the current face direction orientation.

2. The electronic device of claim 1, further comprising an enablement element configured to switch between an active state and a non-active state;
wherein the processor is configured to enable face direction orientation based application activation while the enablement element is in the active state, and wherein the processor is configured to disable face direction orientation based application activation while the enablement element is in the non-active state.

3. The electronic device of claim 1, wherein the processor is configured to activate an application selection program in response to the trigger of the application launch input element, and wherein the application selection program is configured to cause the processor to activate a predetermined application of the plurality of applications based on a face direction orientation determined by the application selection program.

4. The electronic device of claim 3, wherein the application selection program comprises a first predetermined link between the first face direction orientation corresponding to the first face and the first application;
wherein the application selection program is configured to cause the processor to activate the first application based on the first predetermined link when the first face is pointed in the predetermined direction when the application launch input element is triggered;
wherein the application selection program comprises a second predetermined link between the second face direction orientation corresponding to the second face and the second application; and
wherein the application selection program is configured to cause the processor to activate the second application based on the second predetermined link when the second face is pointed in the predetermined direction when the application launch input element is triggered.

5. The electronic device of claim 3, wherein the application selection program is configured to cause the processor to render the user interface on the display device of the electronic device in response to a user input request for the user interface, and wherein the user interface comprises a user input field that allows creation of a link between at least one of the first or the second face direction orientation of the electronic device and at least one of the first or the second application.

6. The electronic device of claim 1, further comprising a third face, a fourth face, a fifth face, and a sixth face;
wherein the processor is configured to identify one of the first face, the second face, the third face, the fourth face, the fifth face, or the sixth face as pointing in the predetermined direction when the application launch input element is triggered; and wherein the processor is configured to activate an application of the plurality of applications that comprises a predetermined link with the identified face.

7. The electronic device of claim 1, further comprising an accelerometer, wherein the processor is configured to identify whether the first face, the second face, or another face of the electronic device is pointed in the predetermined direction based on an output from the accelerometer.

8. An electronic device, comprising:
an orientation determination processor configured to determine, in response to a trigger of an application launch input element of the electronic device, whether a first face, a second face, or another face of the electronic device is pointed in a predetermined direction; and
an application selection processor coupled with the orientation determination processor and configured to activate a different application when the first face is pointed in the predetermined direction when the application launch input element is triggered than when the second face is pointed in the predetermined direction when the application launch input element is triggered,
wherein at least one of the orientation determination processor or the application selection processor is configured to:
display, on a display device of the electronic device, a user interface displaying a list including names of a first face direction orientation corresponding to the first face, a first application of the plurality of applications linked to the first face direction orientation, a second face direction orientation corresponding to the second face, and a second application of the plurality of applications linked to the second face orientation;
display, in the user interface, an indication of a current face direction orientation of the electronic device adjacent a name of the first face direction orientation that is the current face direction orientation;
detect a change of the current face direction orientation from the first face direction orientation to the second face direction orientation; and
cause the indication to move, in the displayed list, from adjacent the name of the first face direction orientation to adjacent a name of the second face direction orientation after detecting the change of the current face direction orientation.

9. The electronic device of claim 8, further comprising an enablement element configured to switch between an active state and a non-active state;
wherein the application selection processor is configured to enable face direction orientation based application activation while the enablement element is in the active state, and wherein the application selection processor is configured to disable face direction orientation based application activation while the enablement element is in the non-active state.

10. The electronic device of claim 8, wherein the application selection processor is configured to render the user interface on the display device of the electronic device in response to a user input request for the user interface, and wherein the user interface comprises a user input field that allows creation of a link between at least one of the first or the second face direction orientation of the electronic device and at least one of the first or the second application to be launched when the application launch input element is triggered.

11. The electronic device of claim 8, further comprising an accelerometer, wherein the orientation determination processor is configured to identify whether the first face, the second face, or another face of the electronic device is pointed in the predetermined direction based on an output from the accelerometer.

12. A method, comprising:
detecting a trigger of an application launch input element of an electronic device;
determining whether a first face, a second face, or another face of the electronic device is pointed in a predetermined direction in response to the trigger of the application launch input element; and
activating, by a processor, a different application when the first face is pointed in the predetermined direction when the application launch input element is triggered than when the second face is pointed in the predetermined direction when the application launch input element is triggered,
displaying, on a display device of the electronic device, a user interface displaying a list including names of a first face direction orientation corresponding to the first face, a first application of the plurality of applications linked to the first face direction orientation, a second face direction orientation corresponding to the second face, and a second application of the plurality of applications linked to the second face orientation;
displaying, in the user interface, an indication of a current face direction orientation of the electronic device along with adjacent a name of the first face direction orientation that is the current face direction orientation;
detecting a change of the current face direction orientation from the first face direction orientation to the second face direction orientation; and
causing the indication to move, in the displayed list, from adjacent the name of the first face direction orientation to adjacent a name of the second face direction orientation after detecting the change of the current face direction orientation.

13. The method of claim 12, further comprising:
detecting a state of an enablement element of the electronic device, wherein the enablement element is configured to switch between an active state and a non-active state;
enabling face direction orientation based application activation while the enablement element is in the active state; and
disabling face direction orientation based application activation while the enablement element is in the non-active state.

14. The method of claim 12, wherein the step of determining comprises:
activating an application selection program in response to the trigger of the application launch input element; and
obtaining face direction orientation data by the application selection program from an orientation sensor of the electronic device after activation of the application selection program.

15. The method of claim 14, wherein the application selection program comprises a first predetermined link between the first face direction orientation corresponding to the first face and the first application, wherein the application selection program comprises a second predetermined link between the second face direction orientation corresponding to the second face and the second application, and wherein the step of activating comprises:
activating the first application based on the first predetermined link when the first face is pointed in the predetermined direction when the application launch input element is triggered; and activating the second application based on the second predetermined link when the second face is pointed in the predetermined direction when the application launch input element is triggered.

16. The method of claim 12, further comprising:

displaying the user interface on the display device of the electronic device in response to a user input request for the user interface; and creating a link between at least one of the first or the second face direction orientation of the electronic device and at least one of the first or the second application identified by a user interacting with a user input field of the user interface.

17. The method of claim 12, wherein the step of determining comprises:

receiving orientation information from an accelerometer of the electronic device; and identifying whether the first face, the second face, or another face of the electronic device is pointed in the predetermined direction based on an output from the accelerometer.

* * * * *